(12) United States Patent
Cisler et al.

(10) Patent No.: US 6,250,703 B1
(45) Date of Patent: Jun. 26, 2001

(54) AUTOMOTIVE REMOVABLE POWER SEAT

(75) Inventors: Jon M. Cisler, Northville; Philip W. Hadley, West Bloomfield; Manoj Srivastava, Rochester Hills; Douglas A. Dingel, Brighton, all of MI (US)

(73) Assignee: Magna Seating Systems Inc., Aurora (CA)

( * ) Notice: Subject to any disclaimer, the term of this patent is extended or adjusted under 35 U.S.C. 154(b) by 0 days.

(21) Appl. No.: 09/446,139

(22) PCT Filed: Apr. 29, 1999

(86) PCT No.: PCT/CA99/00346

§ 371 Date: Dec. 17, 1999

§ 102(e) Date: Dec. 17, 1999

(87) PCT Pub. No.: WO99/56981

PCT Pub. Date: Nov. 11, 1999

Related U.S. Application Data
(60) Provisional application No. 60/083,586, filed on Apr. 30, 1998.

(51) Int. Cl.$^7$ ........................................................ B60N 2/00
(52) U.S. Cl. .................................. 296/65.03; 297/180.12
(58) Field of Search ............................. 296/65.03, 65.01; 297/180.1, 180.12, 180.13

(56) References Cited

U.S. PATENT DOCUMENTS

| | | |
|---|---|---|
| 3,915,493 | 10/1975 | Brown . |
| 4,836,597 | 6/1989 | Izumida . |
| 4,880,199 * | 11/1989 | Harney .............................. 248/396 |
| 4,927,201 | 5/1990 | Froutzis . |
| 4,966,045 * | 10/1990 | Harney .......................... 74/424.8 A |
| 4,971,379 | 11/1990 | Rumpel et al. . |
| 5,014,958 * | 5/1991 | Harney .............................. 248/394 |
| 5,348,264 | 9/1994 | Few e tal. . |
| 5,620,225 | 4/1997 | Harry . |
| 5,696,409 | 12/1997 | Handman et al. . |
| 5,697,662 | 12/1997 | Leftwich . |
| 5,730,414 | 3/1998 | Wenger et al. . |
| 5,752,845 | 5/1998 | Fu . |
| 6,050,835 * | 4/2000 | Henrion ............................. 439/247 |

FOREIGN PATENT DOCUMENTS

| | | |
|---|---|---|
| 2905235 | 8/1980 | (DE) . |
| 0558408 | 2/1993 | (EP) . |

* cited by examiner

Primary Examiner—Joseph D. Pape
Assistant Examiner—Patricia Engle
(74) Attorney, Agent, or Firm—Howard & Howard

(57) ABSTRACT

The subject invention is a vehicle seat assembly which is removably mounted to a floor of a vehicle. The seat assembly includes a seat and an electrical device mounted to the seat. A riser is mounted to the seat and a latch mechanism is mounted to the riser for securing the seat to the vehicle floor. In the preferred embodiment, a first electrical connector is mounted to the latch mechanism for delivering power to the electrical component. A second electrical connector is mounted to the vehicle floor for delivering power to the first electrical connector wherein the first electrical connector automatically engages the second electrical connector when the latch mechanism secures the seat to the vehicle floor such that the first and second electrical connectors close a circuit to power the electrical device.

18 Claims, 5 Drawing Sheets

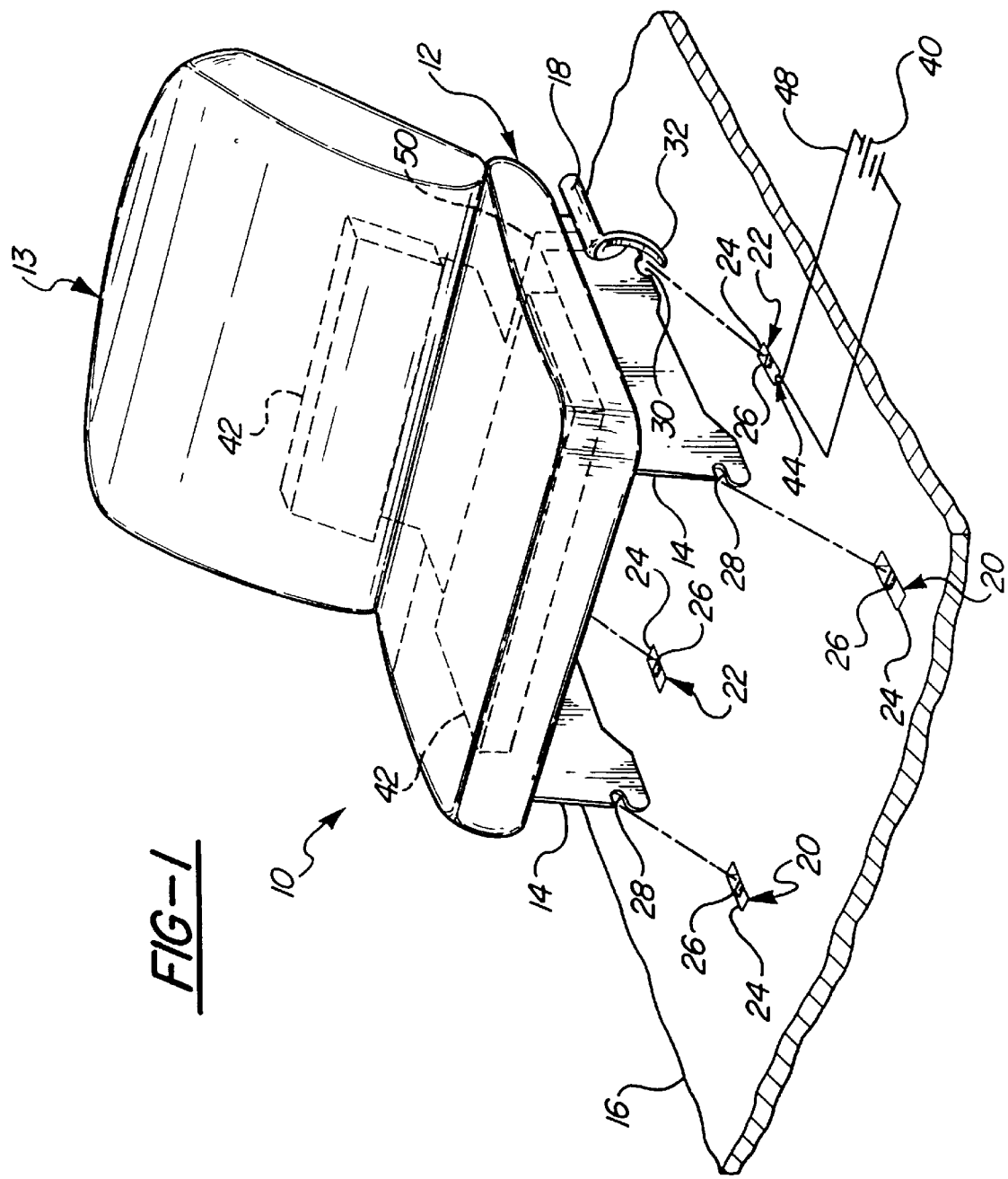

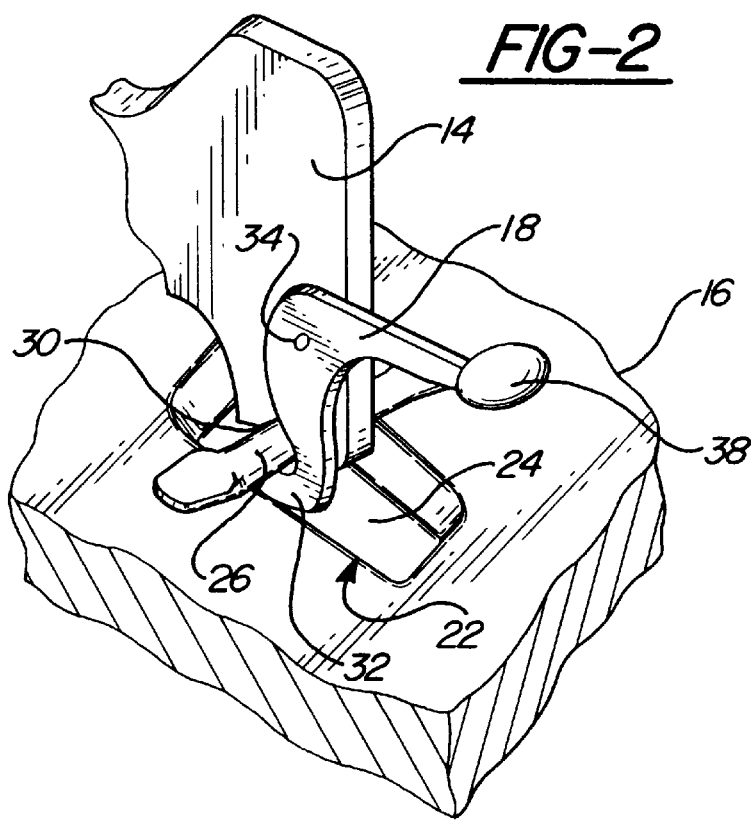
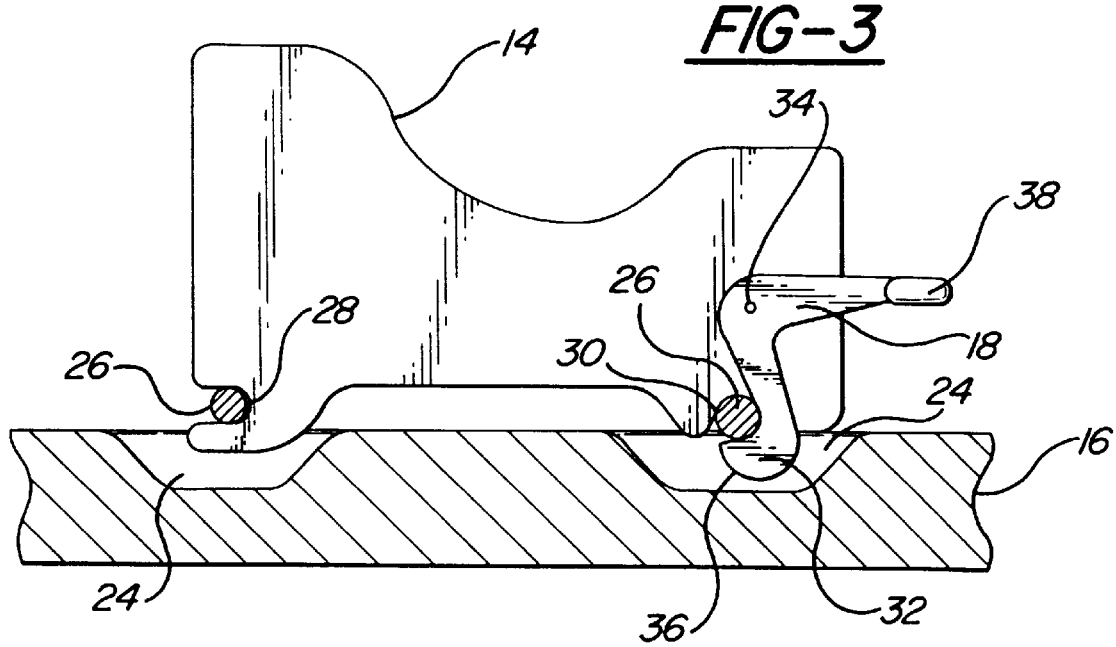

AUTOMOTIVE REMOVABLE POWER SEAT

This application is a 371 of PCT/CA 99/00346 filed Apr. 29, 1999 which claims benefit to U.S. provisional application No. 60/083,586 filed Apr. 30, 1998.

FIELD OF THE INVENTION

The subject invention relates to a removable powered vehicle seat.

DESCRIPTION OF THE PRIOR ART

Removable vehicle seats are common in the industry and are widely used. These seats usually include a seat mounted to a riser or set of risers which are used to mount the vehicle seat within the vehicle. These risers are equipped with mechanisms to removably mount the vehicle seat within the vehicle. Seats of this type are described in U.S. Pat. Nos. 4,836,597 and 4,971,379.

Vehicle seats are also commonly equipped with electrical components mounted within. Most commonly these seats include power adjustment mechanisms such as a powered six-way seat adjuster, or seat heaters. Vehicle seats of this type including seat heaters and power adjustment mechanisms are disclosed in U.S. Pat. Nos. 5,014,958; 4,966,045 and 4,880,199.

While removable vehicle seats have been developed which include power components, these type of seats require that the user manually connect a vehicle mounted electrical connector to a seat mounted electrical connector after the seat has been installed within the vehicle.

SUMMARY OF THE INVENTION

The disadvantages of the prior art may be overcome by providing a vehicle seat assembly which is removably mounted to the floor of a vehicle and includes an electrical component mounted within the seat. The vehicle seat includes a riser mounted to the seat for releasably mounting the seat to the vehicle floor. The seat assembly includes a first electrical contact mounted to the seat for delivering power to the electrical component within the seat, and a second electrical contact adapted to be mounted to the vehicle floor for delivering power to the first electrical contact. The vehicle seat assembly is characterized by the first electrical contact fixedly mounted to the riser to automatically engage the second electrical contact when the vehicle seat assembly is mounted to the vehicle floor whereby the first and second electrical contacts provide a circuit to power the electrical component.

Accordingly, the present invention will allow a removable vehicle seat to be removed from and installed within a vehicle while the electrical connection necessary to power electrical components within the vehicle seat is made automatically and simultaneously when the seat is installed within the vehicle. The subject invention will allow the operator to remove the seat without having to first disconnect the electrical connection, and to install the vehicle seat without having to manually connect a seat mounted electrical connector to a vehicle mounted electrical connector after the seat is installed.

According to another aspect of the invention, there is provided a riser assembly for a vehicle seat assembly adapted to be removably mounted to the floor of a vehicle. The vehicle seat includes a seat and an electrical component mounted to the seat. The riser assembly is mounted to the seat for releasably mounting the seat to the vehicle floor. The riser assembly has a first electrical connector rigidly mounted to the riser for delivering power to the electrical component. A second electrical connector is adapted to be mounted to the vehicle floor for delivering power to the first electrical connector. The first electrical connector is positioned on the riser to automatically engage the second electrical connector when the riser assembly is mounted to the vehicle floor. The first and second electrical contacts close a circuit to power the electrical component.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of a power vehicle seat shown removed from the vehicle floor;

FIG. 2 is a partial perspective view of the latch mechanism for removably mounting the seat to the vehicle floor;

FIG. 3 is a side view of the vehicle seat riser, latch mechanism, and vehicle floor of FIG. 2;

DETAILED DESCRIPTION OF THE PREFERRED EMBODIMENT

Figure 4:
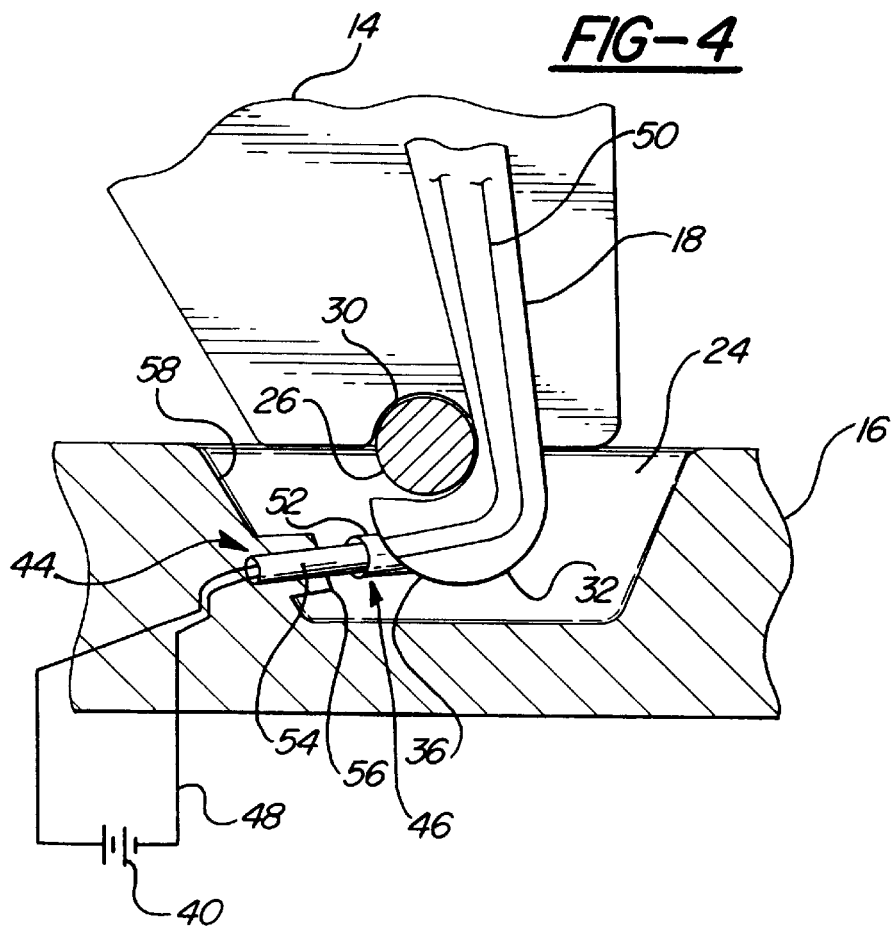
FIG. 4 is side view of the latch mechanism of FIG. 2 showing the first and second electrical contacts.

Referring to the Figures, wherein like numerals indicate like or corresponding parts throughout the several views, a vehicle seat assembly is generally shown at 10. The vehicle seat 10 includes a seat cushion 12, a seat back 13 and a pair of risers 14 for removably mounting the seat 10 to a vehicle floor 16.

Referring to FIGS. 1, 2 and 3 the seat 10 includes a latching mechanism 18 for removably securing the vehicle seat 10 to the vehicle floor 16 provided on one or more of the risers 14. The risers 14 are preferably made of a strong rigid material such a steel or aluminum.

In the preferred embodiment, the seat 10 is mounted to the vehicle floor 16 by way of front seat attaching structures 20 and rear seat attaching structures 22. Each attaching structure 20, 22 includes a well 24 formed within the vehicle floor 16 and a striker pin 26 extending transversely across the well 24 and attached at opposite ends thereof to the vehicle floor 16 by fasteners, welding, or any suitable means. The risers 14 engage the striker pins 26 to secure the vehicle seat 10 to the vehicle floor 16.

Referring to FIGS. 1 and 3, each riser 14 typically includes a forwardly facing front locking hook 28 and a downwardly facing rear locking hook 30, each forming generally U-shaped grooves. Typically the seat 10 is installed into the vehicle by tipping the seat 10 and inserting front ends of the risers 14 into the wells 24 of the front attaching structures 20 so the grooves of the front locking hooks 28 receive the front striker pins 26. The seat is then pivoted downward until the rear striker pins 26 of the rear attaching structures 22 contact the latching mechanism 18.

The latching mechanism 18 includes a hook portion 32 at the lower end of the latching mechanism 18. The latching mechanism 18 pivots about a pivot bolt 34 and is typically spring biased into the locking position as shown in FIG. 3. The hook portion 32 of the latch mechanism 18 preferably includes a bevel 36 formed at the lower end thereof so that when the hook portion 32 contacts the striker pin 26 as the seat assembly 10 is forced downwardly, the latching mechanism 18 is forced to pivot counterclockwise about the pivot bolt 34 against the spring bias until the hook portion 32 of the latching mechanism 18 clears the striker pin 26. When the hook portion 32 of the latching mechanism 18 clears the striker pin 26, the striker pin 26 is received within the groove of the rear locking hooks 30 and the latching mechanism 18 is forced by the spring bias to pivot clockwise to the locking position to secure the striker pin 26 within the groove of the rear locking hook 30 thereby securing the vehicle seat 10 to the vehicle floor 16.

To remove the vehicle seat 10 from the vehicle floor 16, the latching mechanism 18 preferably includes an actuating lever 38 for actuating the latching mechanism 18 against the spring bias thereby releasing the hook portion 32 from the striker pin 26 and allowing the vehicle seat 10 to be lifted out of the attaching structures 20, 22.

The vehicle seat 10 is characterized by automatically providing an electrical a vehicle power source 40 of a vehicle and an electronic component 42 mounted within the vehicle seat 10 when the vehicle seat 10 is mounted to the vehicle floor 16. This connection is made without requiring the user to independently attach or connect the power to the seat 10 after the seat 10 is installed. The electrical component 42 could be a seat heater or adjuster, such as a six-way power seat adjuster such as those disclosed in U.S. Pat. Nos. 5,014,958; 4,966,045 and 4,880,199. The connection is preferably integrated into the seat riser 14 and a portion of the vehicle interior with which the riser 14 comes into close proximity, such as one of the floor mounted attaching structures 20, 22. The electric circuit is completed automatically and simultaneously when the seat riser latching mechanism 18 pivots to the locked position and the vehicle seat 10 is secured to the vehicle floor 16.

Referring to FIG. 1, the passive electrical connection comprises a vehicle-mounted electrical connector 44 disposed proximate one of the rear attaching structures 22 which engages a seat-mounted electrical connector 46 disposed proximate the groove of the rear locking hook 30 of the riser 14. The vehicle mounted electrical connector 44 is connected by circuit 48 to the vehicle power source 40. The seat-mounted electrical connector 46 is connected by circuit 50 to one or more seat-mounted electrically powered components 42 represented schematically by hidden lines.

Referring to FIG. 4, the latching mechanism 18 includes the seat-mounted electrical connector 46 whereby the seat-mounted electrical connector 46 is a female-like socket connector 52. The female-like socket connector 52 is mounted to the hook portion 32 of the latching mechanism 18 in a forwardly facing configuration. When the latching mechanism 18 engages the striker pin 26 of the rear seat attaching structure 22, the female-like socket connector 52 engages the vehicle-mounted connector 44. The vehicle-mounted connector 44 is a male-like pin connector 54 which connects to the circuit 48 of the vehicle power source 40. The male-like pin connector 54 is mounted to a supporting protrusion 56 extending from a forward wall portion 58 of the rear well 24 and is rearwardly facing so as to mate up to the forwardly facing female-like socket connector 52. When the hook portion 32 of the latching mechanism 18 clears the striker pin 26 of the rear seat attaching structure 22, the latching mechanism 18 pivots to the locking position due to the force of the spring bias and the male-like pin connector 54 is received within the female-like socket connector 52, thereby providing a circuit to deliver power to the electrical components 42 within the vehicle seat 10. The female-like socket connector 52 and the male-like pin connector 54 are mounted such that the electrical connection is not made unless the latching mechanism 18 is pivoted fully to the locked position. The male-like pin connector 54 is mounted flexibly to facilitate the mating of the male-like pin connector 54 to the female-like socket connector 52 even if the two connectors 52, 54 are not perfectly aligned when they come into contact.

Figure 5:
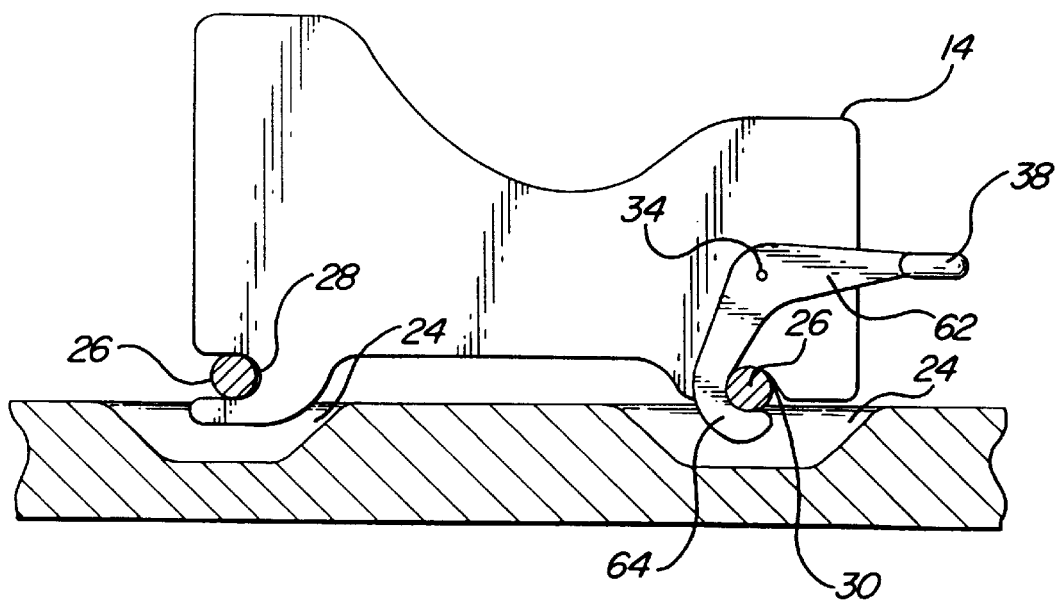
FIG. 5 is a side view of the vehicle seat riser, vehicle floor, and an alternative latch mechanism.
Figure 6:
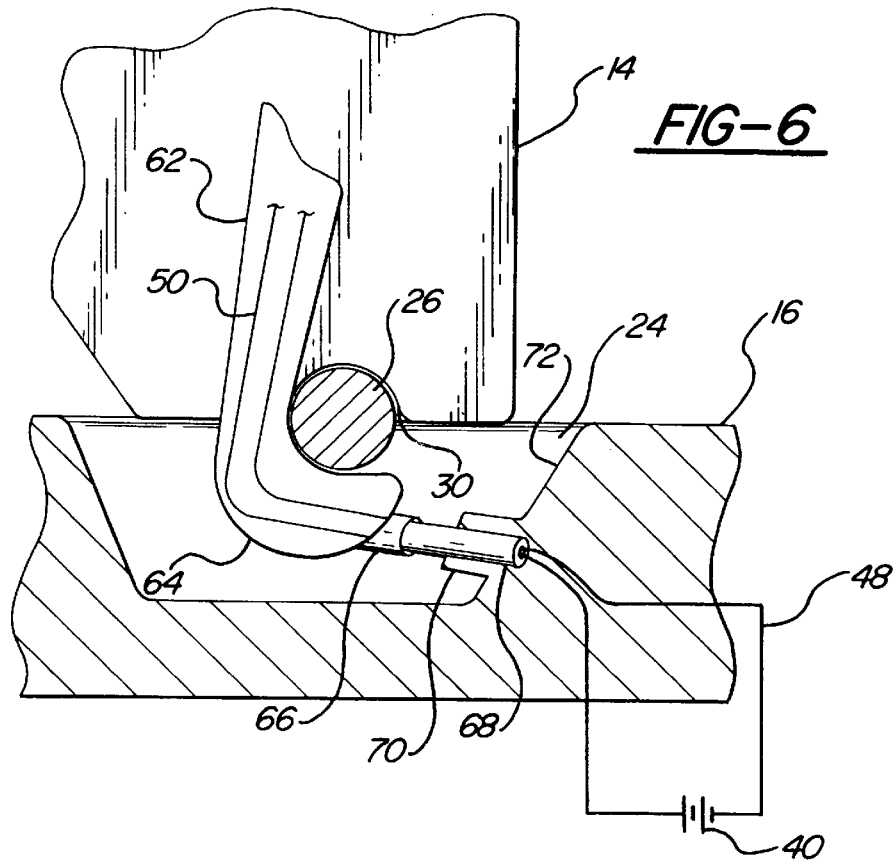
FIG. 6 is a side view of the latch mechanism of FIG. 5 showing the first and second electrical contacts.

Referring to FIGS. 5 and 6 an alternative latching mechanism 62 is disclosed, whereby the latching mechanism 62 is mounted to the riser 14 and a hook portion 64 of the latching mechanism 62 engages the striker pin 26 of the rear seat attaching structure 22 from a side opposite to the arrangement shown in FIGS. 1 through 4. In this configuration, an electrical female-like socket connector 66 is mounted to the hook portion 64 of the latching mechanism 62 in a rearwardly facing configuration and an electrical male-like pin connector 68 is mounted to a supporting protrusion 70 extending from a rear wall portion 72 of the well 24 in the rear seat attaching structure 22 in a forward facing configuration. As in the embodiment shown in FIGS. 1 through 4, the female-like socket connector 66 receives the male-like pin connector 68 to complete the circuit and provide power to the vehicle seat 10 when the latching mechanism 62 pivots to the locking position. However, in the embodiment shown in FIGS. 5 and 6, the latching mechanism 62 pivots in a clockwise direction to release and is biased to pivot in a counter-clockwise direction to the locking position.

Figure 7:
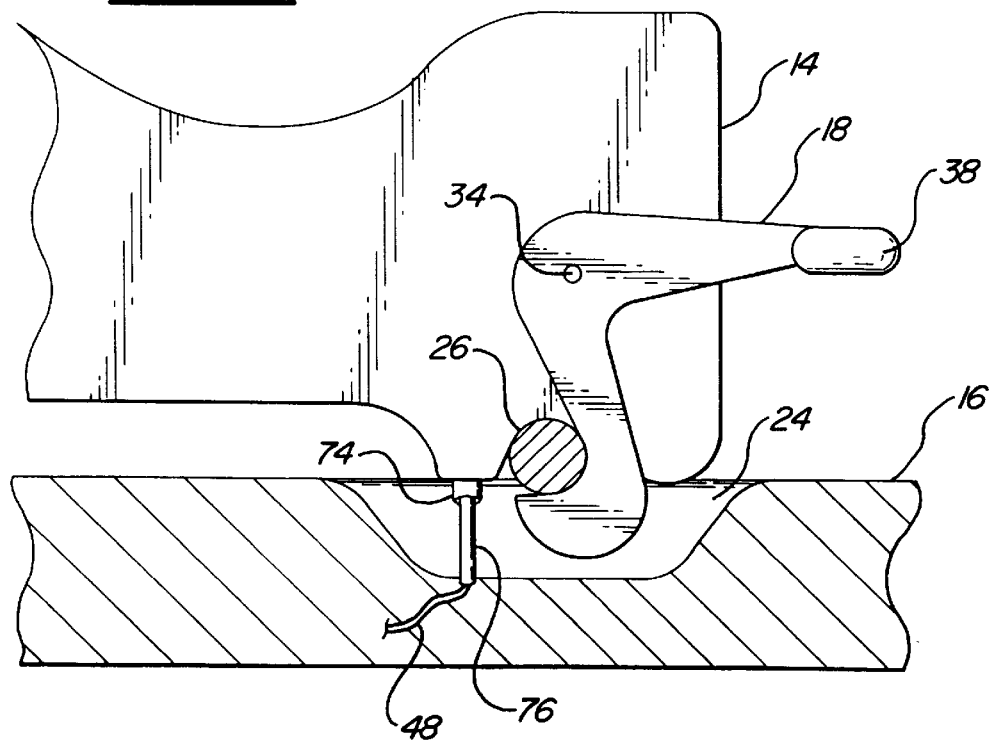
FIG. 7 is a side view of the vehicle seat riser, vehicle floor, latch mechanism, and the first and second electrical contacts in an alternative embodiment.

Referring to FIG. 7, another possible embodiment is shown where an electrical female-like socket connector 74 is mounted in a vertically downward facing direction from the bottom of the riser 14 and an electrical male-like pin connector 76 is mounted in a vertically upward facing direction. When the vehicle seat 10 is mounted to the vehicle floor 16, the female-like socket connector 74 and the male-like pin connector 76 engage as the seat is forced downward until the striker pin 26 of the rear seat attaching structure 22 is received within the groove of the rear locking hook 30 of the riser 14.

As with the previous embodiments, the male-like pin connector 76 is mounted flexibly to allow the female-like socket connector 74 to engage the male-like pin connector 76 even when the two connectors 74, 76 are not perfectly aligned. It is to be understood by those skilled in the art that this embodiment could be utilized with either of the two previously mentioned latching mechanisms 18, 62.

Figure 8:
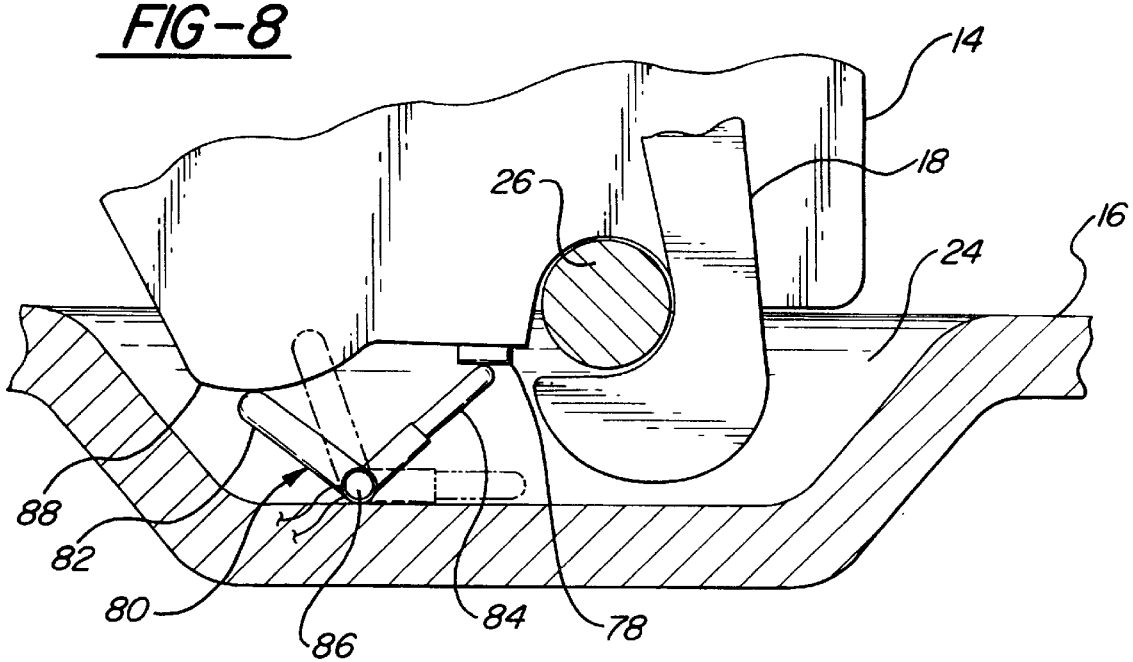
FIG. 8 is a side view of the vehicle seat riser, vehicle floor, latch mechanism, and the first and second electrical contacts in an alternative embodiment.

Referring to FIG. 8, an additional embodiment is disclosed wherein a seat mounted electrical connector 78 is mounted to the bottom of the riser 14. A vehicle mounted electrical connector 80 includes an actuating lever portion 82 and a connector portion 84. The actuating lever portion 82 and the connector portion 84 are arranged in a substantially "L" shaped configuration and mounted pivotally to the vehicle floor 16. The vehicle mounted connector 80 pivots about a pivot point 86 between a non-operative position and an operative position. The vehicle mounted connector 80 is spring biased such that when the riser 14 is not present, the connector portion 84 is lying along the vehicle floor 16 in a non-operative position, as shown in phantom, and the actuating lever portion 82 of the vehicle mounted electrical connector 80 is elevated as shown in FIG. 8 in phantom. The riser 14 includes a canning portion 88, whereby when the riser 14 is lowered into position, the camming portion 88 of the riser 14 protrudes downward contacting the actuating lever portion 82 of the connector 80 and forces the actuating lever portion 82 downward against the spring bias. The downward motion of the actuating lever portion 82 forces the vehicle mounted connector 80 to pivot counterclockwise, causing the connector portion 84 to elevate and make contact with the seat mounted electrical connector 78 as shown in solid lines in FIG. 8.

Figure 9:
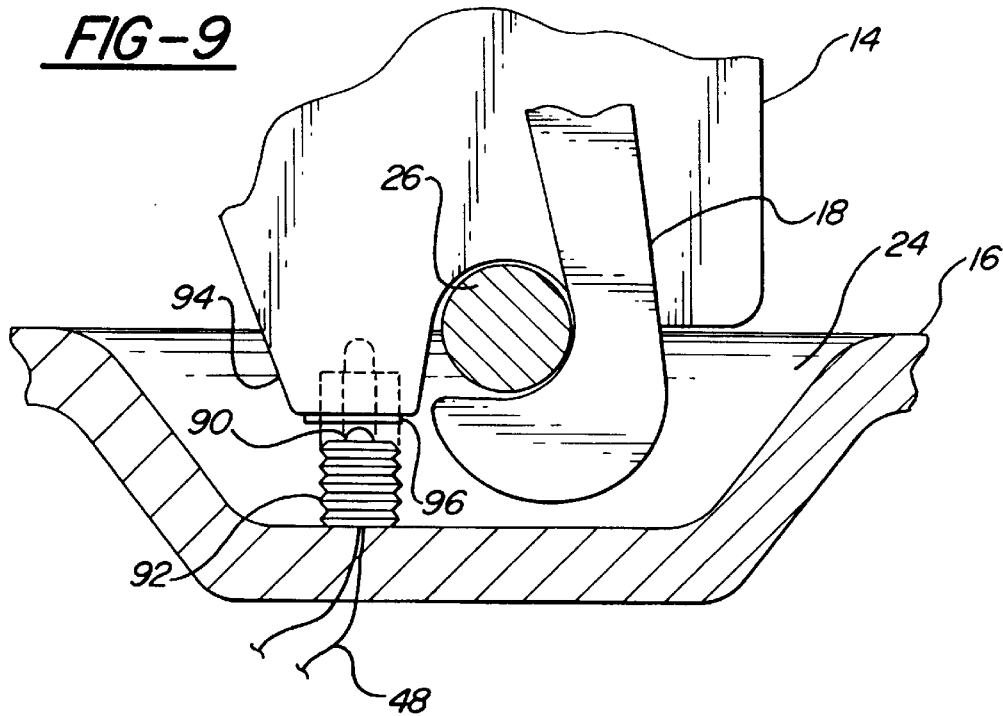
FIG. 9 is a side view of the vehicle seat riser, vehicle floor, latch mechanism, and the first and second electrical contacts in an alternative embodiment.

Referring to FIG. 9, another alternate embodiment is shown wherein a vehicle mounted connector 90 includes a retractable switch that is protectively covered with an insulated surrounding bellows 92 made of plastic or some other suitable flexible material. The protective bellows 92 prevents foreign objects from entering the retractable switch thereby preventing possible damage to the switch and/or connector 90. The retractable switch is spring biased upward to keep the switch open as shown in hidden lines. When the vehicle seat 10 is mounted a lower extension 94 of the riser 14 contacts the connector 90 and forces it downward until it closes the switch. The lower extension 94 of the riser 14 includes a conducting plate electrical connector 96 so when the switch is closed, the circuit is connected and power is supplied to the electrical components 42 within the vehicle seat 10.

The invention has been described in an illustrative manner, and it is to be understood that the terminology which has been used is intended to be in the nature of words of description rather than of limitation. Many modifications and variations of the present invention are possible in light of the above teachings. It is, therefore, to be understood that within the scope of the appended claims, the invention may be practiced otherwise than as specifically described.

What is claimed is:

1. A vehicle seat assembly adapted to be removably mounted to a floor of a vehicle comprising:
    a seat;
    an electrical component mounted to said seat;
    a riser mounted to said seat;
    a latch mechanism mounted to said riser for releasably securing said seat to the vehicle floor;
    a first electrical connector mounted to said latch mechanism delivering power to said electrical component; and
    a second electrical connector adapted to be mounted to the vehicle floor for delivering power to said first electrical connector wherein said first electrical connector automatically engages said second electrical connector when said latch mechanism secures said seat such that said first and second electrical connectors close a circuit to power said electrical component.

2. An assembly as set forth in claim 1 wherein said latch mechanism is pivotally mounted to said riser and includes a hook portion for engaging the vehicle floor.

3. An assembly as set forth in claim 2 including a striker pin adapted to be mounted to the vehicle floor for engaging said hook portion of said latch mechanism and securing said seat to the vehicle floor.

4. An assembly as set forth in claim 3 wherein said latch mechanism is spring biased to a locked position whereby said latch mechanism pivots against said spring bias when said latch mechanism contacts said striker pin and pivots back to said locked position when said hook portion of said latch mechanism clears said striker pin.

5. An assembly as set forth in claim 4, wherein said first electrical connector is a female-like socket affixed in a forward facing direction and said second electrical connector is a male-like pin affixed in a rearwardly facing direction whereby said female-like socket receives said male-like pin when said latch mechanism pivots to said locked position.

6. An assembly as set forth in claim 5 wherein said male-like pin is adapted to be flexibly mounted to the vehicle floor to allow said male-like pin to align with and engage said female-like socket.

7. A riser assembly for a vehicle seat assembly adapted to be removably mounted to a floor of a vehicle, the vehicle seat assembly comprising a seat and an electrical component mounted to the seat; said riser assembly mounted to the seat for releasably mounting the seat to the vehicle floor and comprising;
    a riser;
    a latch mechanism mounted to said riser for releasably securing the vehicle seat assembly to the vehicle floor;
    a first electrical connector rigidly mounted to said latch mechanism for delivering power to said electrical component; and
    a second electrical connector adapted to be mounted to the vehicle floor for delivering power to said first electrical connector wherein said first electrical connector automatically engages said second electrical connector when said latch mechanism secures the vehicle seat assembly such that said first and second electrical connectors close a circuit to power the electrical component.

8. An assembly as set forth in claim 7 wherein said latch mechanism is pivotally mounted to said riser and includes a hook portion for engaging the vehicle floor.

9. The assembly as set forth in claim 8 wherein said latch mechanism is spring biased to a locked position whereby said latch mechanism pivots against said spring bias when said latch mechanism contacts a striker pin and pivots back to said locked position when said hook portion of said latch mechanism clears said striker pin.

10. A riser assembly as set forth in claim 9 wherein said first electrical connector is a female-like socket affixed in a forward facing direction and said second electrical connector is a male-like pin affixed in a rearwardly facing direction whereby said female-like socket receives said male-like pin when said latch mechanism pivots to said locked position.

11. An assembly as set forth in claim 10 wherein said male-like pin is adapted to be flexibly mounted to the vehicle floor to allow said male-like pin to align with and engage said female-like socket.

12. A vehicle seat assembly adapted to be removably mounted to a floor of a vehicle comprising:
    a seat;
    an electrical component mounted to said seat;
    a riser mounted to said seat;
    a latch mechanism mounted to said riser for releasably securing said seat to the vehicle floor;
    a first electrical connector mounted to said riser for delivering power to said electrical component; and
    a second electrical connector adapted to be mounted to the vehicle floor directly below said first electrical connector wherein said first electrical connector automatically engages said second electrical connector when said latch mechanism secures said seat such that said first and second electrical connectors close a circuit to power said electrical component.

13. An assembly as set forth in claim 12 wherein said first electrical connector is a female-like socket affixed in a vertical downwardly facing direction and said second electrical connector is a male-like pin affixed in a vertical upwardly facing direction whereby said female-like socket receives said male-like pin when said latch mechanism secures said seat.

14. An assembly as set forth in claim 13 wherein said male-like pin is adapted to be flexibly mounted to the vehicle floor to allow said male-like pin to align with and engage said female-like socket.

15. An assembly as set forth in claim 2 wherein said second electrical connector includes a connector portion and an actuating lever portion, said actuating lever portion contacting said riser and moving said connector portion into engagement with said first electrical connector when said latch mechanism secures said seat.

16. An assembly as set forth in claim 15 wherein said second electrical connector is spring biased from an operative position engaging said first electrical connector to a non-operative position when said latch mechanism releases said seat.

17. An assembly as set forth in claim 12 wherein said second electrical connector includes a retractable contact switch which is spring biased upward to an open condition whereby said contact switch is forced to a closed position by said first electrical connector when said latch mechanism secures said seat.

18. An assembly as set forth in claim 17 wherein said contact switch includes a protective bellows for surrounding and protecting said switch.

\* \* \* \* \*